(12) United States Patent
Bosek

(10) Patent No.: US 12,740,541 B2
(45) Date of Patent: Sep. 22, 2026

(54) CONTROL UNIT, COMPUTER-IMPLEMENTED METHOD FOR CONTROLLING A FLOW OF MILK, COMPUTER PROGRAM AND NON-VOLATILE DATA CARRIER

(71) Applicant: DELAVAL HOLDING AB, Tumba (SE)

(72) Inventor: Lukasz Bosek, Tumba (SE)

(73) Assignee: DeLaval Holding AB, Tumba (SE)

( * ) Notice: Subject to any disclaimer, the term of this patent is extended or adjusted under 35 U.S.C. 154(b) by 400 days.

(21) Appl. No.: 18/558,703

(22) PCT Filed: May 4, 2022

(86) PCT No.: PCT/SE2022/050432
§ 371 (c)(1),
(2) Date: Nov. 2, 2023

(87) PCT Pub. No.: WO2022/240335
PCT Pub. Date: Nov. 17, 2022

(65) Prior Publication Data

US 2024/0215528 A1 Jul. 4, 2024

(30) Foreign Application Priority Data

May 11, 2021 (SE) .................................... 2150596-1

(51) Int. Cl.
*A01J 9/04* (2006.01)

(52) U.S. Cl.
CPC ...................................... *A01J 9/04* (2013.01)

(58) Field of Classification Search
USPC ........................................................... 700/90
See application file for complete search history.

(56) References Cited

U.S. PATENT DOCUMENTS

| | | | | |
|---|---|---|---|---|
| 4,034,711 A * | 7/1977 | Bender | A01J 5/003 119/14.05 |
| 2004/0129227 A1* | 7/2004 | Lidman | A01J 9/04 119/14.09 |

(Continued)

FOREIGN PATENT DOCUMENTS

| | | |
|---|---|---|
| GB | 2303226 A | 2/1997 |
| WO | 9716962 A1 | 5/1997 |

(Continued)

OTHER PUBLICATIONS

GB_2303226_A (Year: 1997).*

(Continued)

*Primary Examiner* — Hien D Khuu
(74) *Attorney, Agent, or Firm* — NIXON & VANDERHYE

(57) ABSTRACT

A control unit arranged to control a flow of milk through a cooling system from a balance tank to a storage tank where the balance tank receives an input in the form of milk from a number of milking points and the control unit receives a first level-indicating signal reflecting a milk level in the balance tank and a prediction parameter indicating an estimated future input of milk from the number of milking points for generating a first control signal to a milk pump in the cooling system for causing the flow of milk to be pumped out from the balance tank at a flow rate determined by the first control signal.

19 Claims, 2 Drawing Sheets

(56) References Cited

U.S. PATENT DOCUMENTS

| | | | | |
|---|---|---|---|---|
| 2006/0124065 | A9* | 6/2006 | Lidman | A01J 9/04 119/14.09 |
| 2007/0272158 | A1* | 11/2007 | Kaever | A01J 9/04 119/14.08 |
| 2010/0186604 | A1 | 7/2010 | Otake et al. | |
| 2020/0008389 | A1* | 1/2020 | Stopa | A23B 11/14 |
| 2021/0112769 | A1* | 4/2021 | Van De Meerendonk | A23B 11/12 |

FOREIGN PATENT DOCUMENTS

| | | | |
|---|---|---|---|
| WO | 2018111184 | A1 | 6/2018 |
| WO | 2019004818 | A1 | 1/2019 |

OTHER PUBLICATIONS

JP_2003344138_A (Year: 2003).*

International Search Report for PCT/SE2022/050432 mailed Sep. 15, 2022, 3 pages.

Written Opinion of the ISA for PCT/SE2022/050432 mailed Sep. 15, 2022, 9 pages.

Swedish Search Report for SE2150596-1 mailed Dec. 21, 2021, 2 pages.

* cited by examiner

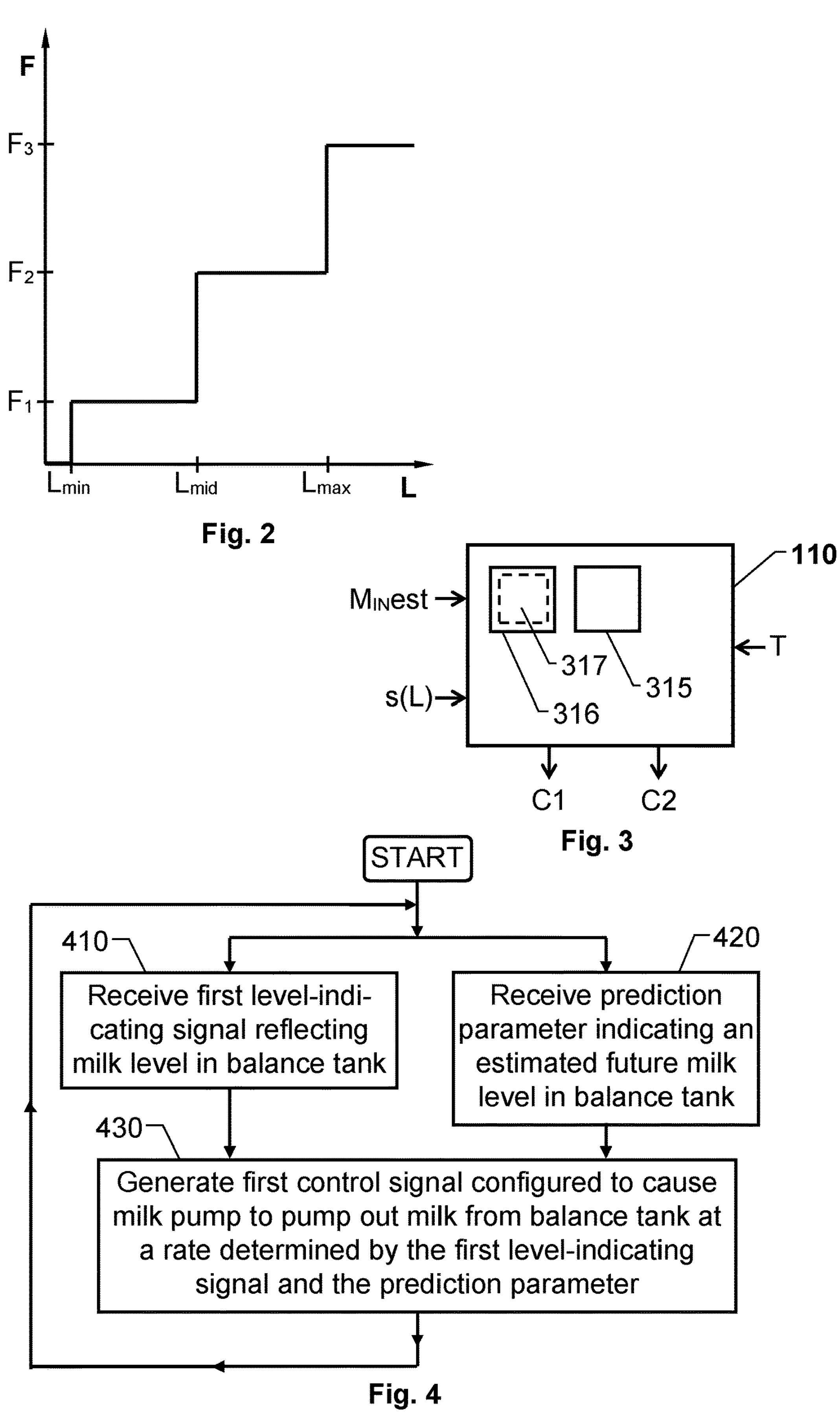
F
F3
F2
F1
Lmin
Lmid
Lmax
L
Fig. 2
110
MINest
T
317
315
s(L)
316
C1
C2
Fig. 3
START
410
420
Receive first level-indicating signal reflecting milk level in balance tank
Receive prediction parameter indicating an estimated future milk level in balance tank
430
Generate first control signal configured to cause milk pump to pump out milk from balance tank at a rate determined by the first level-indicating signal and the prediction parameter
Fig. 4

CONTROL UNIT, COMPUTER-IMPLEMENTED METHOD FOR CONTROLLING A FLOW OF MILK, COMPUTER PROGRAM AND NON-VOLATILE DATA CARRIER

CROSS-REFERENCE TO RELATED APPLICATIONS

This application is the U.S. national phase of International Application No. PCT/SE2022/050432 filed May 4, 2022 which designated the U.S. and claims priority to SE 2150596-1 filed May 11, 2021, the entire contents of each of which are hereby incorporated by reference.

TECHNICAL FIELD

The present invention relates generally to milk-flow and cooling regulation. Especially, the invention relates to a control unit arranged to control a flow of milk through a cooling system from a balance tank to a storage tank and a corresponding computer-implemented method. The invention also relates to a computer program and a non-volatile data carrier storing such a computer program.

BACKGROUND

For quality and hygienic reasons it is important that the temperature of the milk extracted from milk-producing animals is kept sufficiently low throughout the entire extraction and storage process. The rate at which an incoming milk flow enters the system is typically unknown, at least to some extent, due to the fact that different animals produce different amounts of milk per unit time. The number of animals from which milk is extracted may also vary during a milking session. It is therefore challenging to control the cooling of the milk between an input balance tank and a storage tank, where the milk is held until being transported to a dairy, or similar facility.

WO 97/16962 shows an apparatus for cooling a product, which apparatus comprises a first evaporator and a second evaporator separate from the first evaporator, a first heat exchanger incorporating the first evaporator and a second heat exchanger incorporating the second evaporator. In operation, the product or an intermediate heat transfer medium is cooled in at least two first stages. During the first stage, heat is withdrawn from the product or the medium by the first evaporator cooling the product or the medium to an intermediate temperature. During the second stage, heat is withdrawn from the product or the medium by the second evaporator further cooling the product or the medium to the desired temperature. Since the product or the medium is partially cooled by an evaporator operating at a higher evaporating temperature than required for achieving the desired temperature, an improved energy efficiency is achieved.

WO 2018/111184 discloses a method for cooling milk in a milking arrangement. A milk cooling apparatus of the milking arrangement contains a coolant circuit for heat exchange between milk and a coolant and a refrigerant circuit for heat exchange between a refrigerant and the coolant. The method involves: controlling the refrigerant circuit to maintain a predefined temperature range; receiving a first signal relating to commencement or increase of a milk flow from a milking system of the milking arrangement; starting or increasing circulation of coolant in the coolant circuit; and leading the milk flow through the milk cooling apparatus.

WO 2019/004818 describes a milking system containing a milking device for milking a milking from a dairy animal during a milking session, and is provided with a control unit for the milking system, milking cups, a first milk jar for receiving the milking, a first pumping device for pumping the milking from the first milk jar to a first milk pipe, a second milk jar in flow communication with the first milk pipe for receiving the milking from the first milk jar therefrom, and a second pumping device for pumping the milking from the second milk jar into a second milk pipe. The first pumping device is configured to pump the milking at a first flow rate and the second pumping device is configured to pump the milking at a second flow rate, which is lower than the first flow rate. The milking system furthermore contains a heat-exchanging system in flow communication with the second milk pipe for receiving the milking pumped in the second milk pipe and for bringing the received milking to a desired temperature. The capacity of the milking system is maintained by pumping the milking directly after a milking, but by collecting this milking in the second milk jar and pumping it relatively slowly and steadily, the milk quality is maintained more reliably. In addition, a downstream heat exchanger can then be made smaller. Also, it is then easier to change the desired temperature.

Thus, designs are known according to which the capacity for pumping and cooling of a product, such as extracted milk, can be adapted to varying incoming amounts of the product. This is beneficial for ensuring a stable temperature and maintaining a high quality of the product. However, the known solutions are suboptimal with the respect to the overall cooling efficiency and energy consumption in the pumping and cooling system.

SUMMARY

The object of the present invention is therefore to offer a solution that solves the above problem by providing an efficient cooling and economizing of the energy resources used for pumping and cooling extracted milk before storing it in a storage tank.

According to one aspect of the invention, the object is achieved by a control unit arranged to control a flow of milk through a cooling system from a balance tank to a storage tank. The balance tank receives an input in the form of milk from a number of milking points. The control unit is configured to receive a first level-indicating signal reflecting a milk level in the balance tank. Based thereon, the control unit is configured to generate a first control signal to a milk pump in the cooling system. The milk pump, in turn, is arranged to cause the flow of milk to be pumped out from the balance tank at a flow rate determined by the first control signal. The control unit is also configured to receive a prediction parameter indicating an estimated future input of milk from the number of milking points, and generate the first control signal on the further basis of the prediction parameter.

This control unit is advantageous because the proactive control of the milk-flow rate avoids unnecessary temporary increases or decreases in the pumping and cooling capacity by maintaining a comparatively stable flow of milk through the cooling system.

According to one embodiment of this aspect of the invention, the prediction parameter is based on a second level-indicating signal reflecting a milk level in a receiver tank in which the milk from at least one, and preferably several, of the number of milking points is collected before being fed into the balance tank. The second level-indicating signal thus gives advance information about a milk level to be expected in the balance tank, and consequently future variations in the milk level can be taken into account in a straightforward manner.

According to other embodiments of this aspect of the invention, the prediction parameter is based on: an opening and/or closing of an entrance gate in to a closed area where the number of milking points are located; an opening and/or closing of an exit gate out from the closed area where the number of milking points are located; information about a number of milking animals currently being attached to the number of milking points; information about a number of milking animals currently being detached from the number of milking points; information about a milk flow or milk yield from the milking animals currently delivering milk via the number of milking points; and/or information about a previous milk yield or milk flow curve of the milking animals currently delivering milk via the number of milking points. Thereby, more sophisticated estimates can be made about expected future milk levels in the balance tank, and as a result, the milk pump may be controlled in an accurate and smarter manner with respect to the overall energy consumption.

According to yet other embodiments of this aspect of the invention, the prediction parameter is based on identity information relating to which milking animals that are present in the closed area where the number of milking points are located and/or temporal data indicating an extension of a period during which milking animals have been present in the closed area where the number of milking points are located. Analogous to the above, this enables sophisticated estimation of expected future milk levels in the balance tank, and consequently a smart control of the milk pump.

According to still another embodiment of this aspect of the invention, the control unit is configured to generate the first control signal based on the first level-indicating signal such that an indicated milk level in the balance tank above a particular one of at least two predefined threshold levels causes the milk pump to pump the flow of milk out from the balance tank at a respective rate corresponding to each one of the at least two predefined threshold levels.

Preferably, the control unit is configured to generate the first control signal based on the prediction parameter such that the prediction parameter overrides the first level-indicating signal to cause the milk pump to pump the flow of milk out from the balance tank at a lower rate than the rate corresponding to the particular one of the at least two predefined threshold levels if: the first level-indicating signal indicates that the milk level in the balance tank is above the particular one of at least two predefined threshold levels and the prediction parameter indicates that the estimated future input of milk from the number of milking points is decreasing. Thereby, an unnecessary temporary increased pumping operation of the milk pump can be avoided. In other words, the overriding prediction parameter maintains the milk flow rate even if the first level-indicating signal indicates that the milk pump should switch to an increased flow rate pumping operation. The milk flow rate through the cooling system is hereby stabilized by the overriding prediction parameter to provide a more effective cooling and stable temperature on the milk. A full speed or emergency operation of the milk pump can in this way also be avoided, which full speed or emergency operation aims at preventing a flooding of the balance tank when the milk level exceeds a high threshold level.

Analogously, it is further preferable if the control unit is configured to generate the first control signal based on the prediction parameter such that the prediction parameter overrides the first level-indicating signal to cause the milk pump to pump the flow of milk out from the balance tank at a higher rate than the rate corresponding to the particular one of the at least two predefined threshold levels if the first level-indicating signal indicates that the milk level in the balance tank is below the particular one of at least two predefined threshold levels and the prediction parameter indicates that the estimated future input of milk from the number of milking points is increasing. Thereby, an unnecessary temporary decreased pumping operation of the milk pump can be avoided. Hence, the overriding prediction parameter maintains the flow rate from the milk pump even if the first level-indicating signal indicates that the milk pump should switch to decreased flow rate or pumping operation. The milk flow rate through the cooling system is hereby stabilized by the overriding prediction parameter to provide a more effective cooling and stable temperature on the milk. An unnecessary stopping/idle operation and starting operation of the milk pump can also be avoided when the milk level temporarily drops below a low threshold level in the balance tank.

According to another embodiment of this aspect of the invention, the control unit is further configured to: receive a temperature-indicating signal from a temperature sensor measuring a temperature of the flow of milk before entering the storage tank; and generate the first control signal on the further basis of the temperature-indicating signal such that a cooling capacity of the cooling system is increased if the temperature-indicating signal reflects a milk temperature above a set temperature. Hence, the cooling requirement may be adequately weighed into the control loop.

According to yet another embodiment of the invention, the control unit is configured to generate the first control signal based on the temperature-indicating signal such that the cooling capacity of the cooling system is decreased if the temperature-indicating signal reflects a milk temperature below the set temperature. As a result, the energy resources may be further economized.

Preferably, the cooling system comprises a heat exchanger configured to transfer heat energy from the flow of milk to a coolant being circulated in a chiller by means of a coolant pump operating in response to a second control signal. The control unit is further configured to generate the second control signal based on the first level-indicating signal so that: a flow of the coolant and/or the cooling capacity of the chiller increases if the prediction parameter indicates that the estimated future input of milk from the number of milking points will increase during a predefined future interval and any one of the at least two predefined threshold levels will cause the milk pump to pump the flow of milk out from the balance tank at a higher flow rate, and the flow of the coolant and/or the cooling capacity of the chiller decreases if the prediction parameter indicates that the estimated future input of milk from the number of milking points will decrease during the predefined future interval and any one of the at least two predefined threshold levels will cause the milk pump to pump the flow of milk out from the balance tank at a lower flow rate. This proactive control or adaptation of the cooling system capacity to changes in the milk pump flow rate provides a more effective cooling and stable temperature on the milk. It further enhances the overall energy efficiency of the cooling system.

According to another aspect of the invention, the object is achieved by a computer-implemented method for controlling a flow of milk through a cooling system from a balance tank to a storage tank. The balance tank receive an input in the form of milk from a number of milking points. The method involves receiving a first level-indicating signal reflecting a milk level in the balance tank. Based thereon, a first control signal is generated to a milk pump in the cooling system, which milk pump is arranged to cause the flow of milk to be pumped out from the balance tank at a flow rate determined by the first control signal. The method also involves receiving a prediction parameter indicating an estimated future input of milk from the number of milking points, and on the further basis thereof, generating the first control signal of the prediction parameter. The advantages of this method, as well as the preferred embodiments thereof, are apparent from the discussion above with reference to the proposed control unit.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

FIG. 2 shows a diagram exemplifying a relationship between a milk-flow rate and predefined threshold levels in a balance tank according to one embodiment of the invention;

FIG. 3 shows a block diagram of the control unit according to the invention; and FIG. 4 illustrates, by means of a flow diagram, the method according to a preferred embodiment of the invention.

DETAILED DESCRIPTION

Figure 1:
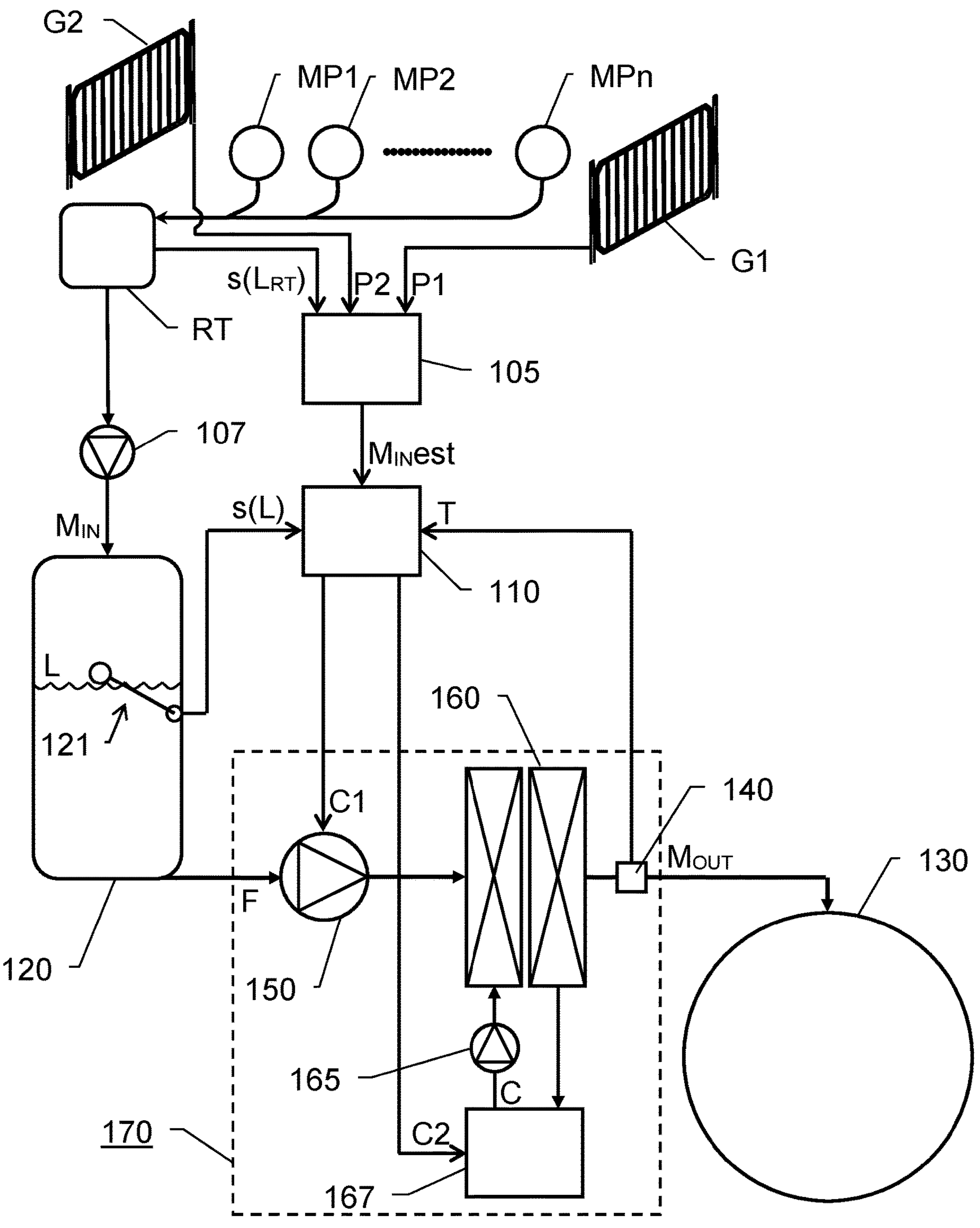
FIG. 1 schematically illustrates a milk handling system including a control unit according to one embodiment of the invention.

FIG. 1 shows a schematic illustration of a milk handling system including a control unit 110 according to one embodiment of the invention.

The control unit 110 is arranged to control a flow of milk F through a cooling system 170 from a balance tank 120 to a storage tank 130. The storage tank 130 is adapted to accumulate milk that has been collected during a relatively long period, namely between consecutive pickups of the milk for further transport to a dairy or similar facility, which pickups typically occur every 24 or 48 hours. Consequently, the storage tank 130 has a comparatively large capacity. The balance tank 120, on the other hand, has a comparatively low capacity. Namely, here the milk is just buffered briefly before being forwarded through the cooling system 170. The balance tank 120 is adapted to receive an input $M_{IN}$ in the form of milk having been extracted from milking animals at a number of milking points MP1, MP2, . . . , MPn, for example located in a milking parlor or on a rotary milking parlor. The milking points MP1, MP2, . . . , MPn may either feed milk to the balance tank 120 directly, or via one or more so-called end units/receiver tanks RT. Each of the receiver tanks RT has a relatively small storage capacity, say in the range of 50 to 200 liters. The storage capacity of each of the balance tank 120 and the storage tank 130 respectively is substantially larger than that of the receiver tank RT, and sizes typically depend on the number of milking points MP1, MP2, . . . , MPn. At least one receiver pump 107 may be arranged to pump the milk collected in the receiver tank(s) RT to the balance tank 120. The receiver pump 107 is normally controlled in response to a Boolean variable, i.e. the receiver pump 107 is either on or off.

The control unit 110 is configured to receive a first level-indicating signal s(L) and a prediction parameter $M_{IN}$-est. The first level-indicating signal s(L) reflects a milk level L in the balance tank 120. The prediction parameter $M_{IN}$est indicates an estimated future input $M_{IN}$ of milk from the number of milking points MP1, MP2, . . . , MPn.

Based on the first level-indicating signal s(L) and the prediction parameter $M_{IN}$est, the control unit 110 is configured to generate a first control signal C1 to a milk pump 150 in the cooling system 170. In response to the first control signal C1, the milk pump 150 is arranged to cause the flow of milk F to be pumped out from the balance tank 120 at a flow rate determined by the first control signal C1.

The prediction parameter $M_{IN}$est may for example be based on a second level-indicating signal $s(L_{RT})$ reflecting a milk level in the receiver tank(s) RT in which the milk from at least one, and preferably several or all, of the milking points MP1, MP2, . . . , MPn is collected before being fed into the balance tank 120. Thus, the control unit 110 obtains straightforward and reliable advance information about a future input $M_{IN}$ to be expected to the balance tank 120.

According to one embodiment of the invention, the prediction parameter $M_{IN}$est is based on an opening and/or closing of an entrance gate G1 in to a closed area where the milking points MP1, MP2, . . . , MPn are located, typically a milking parlor, e.g. of herringbone or parallel type. Via information about the opening and/or closing of the entrance gate G1, the control unit 110 may gain information about a point in time when milking animals are entering the milking parlor and a new milking session is initiated.

Additionally, or alternatively, the prediction parameter $M_{IN}$est may be based on an opening and/or closing of an exit gate or neck rail(s) G2 out from the closed area, such as one or several neck rails in the milking parlor, where the milking points MP1, MP2, . . . , MPn are located. Via information about the opening and/or closing of the exit gate or neck rail(s) G2, the control unit 110 may gain information about a point in time when a milking session has ended.

Of course, knowledge about start and/or end of milking sessions is important to estimate the future input $M_{IN}$ of milk into the balance tank 120.

Additionally, or alternatively, the prediction parameter $M_{IN}$est may be based on information about a number of milking animals currently being attached to the milking points MP1, MP2, . . . , MPn. This information may be acquired directly from identity readers and/or milking point controllers at the respective milking points MP1, MP2, . . . , MPn, or via a central unit in the milking installation. Similarly, additionally or alternatively, the prediction parameter $M_{IN}$est may be based on information about a number of milking animals currently being detached from the milking units at the milking points MP1, MP2, . . . , MPn. Knowledge about attachment and/or detachment of individual milking units to the animals enables relatively precise estimation of the future input $M_{IN}$ of milk into the balance tank 120.

Even better estimates may be made based on information about the milk flow or milk yield from the milking animals currently delivering milk via the number of milking points MP1, MP2, . . . , MPn. Therefore, it is preferable if the prediction parameter $M_{IN}$est is based on such information as alternative or in addition to the above. Moreover, the prediction parameter $M_{IN}$est may be based on information about a previous milk yield or milk flow curve of each milking animal that is currently delivering milk via the milking points MP1, MP2, . . . , MPn. Namely, this enables estimation of a current milk flow from the animals at each point in time during the milking session. The information about previous milk yields and/or previous milk flow curves is preferably received from a central unit in the milking installation, which central unit is communicatively connected to a database containing this information.

According to other embodiments of the invention, the prediction parameter $M_{IN}$est is based on identity information relating to which milking animals that are present in the closed area where the milking points MP1, MP2, . . . , MPn are located, and/or temporal data indicating an extension of a period during which milking animals have been present in the closed area where the milking points MP1, MP2, . . . , MPn are located. This may not provide exactly the same degree of precision as the current or previous milk yields or previous milk flow curves. However, the identity information and the temporal data may offer a comparatively reliable basis for estimating the future input $M_{IN}$ of milk into the balance tank 120 based upon which the milk pump 150 may be controlled in a proactive manner.

It is advantageous if the control unit 110 is configured to receive a temperature-indicating signal T from a temperature sensor 140 measuring a temperature of the flow of milk F before entering the storage tank 130, i.e. when leaving the cooling system 170 in the form of an output flow of milk $M_{OUT}$. The control unit 110 is further configured to generate the first control signal C1 on the further basis of the temperature-indicating signal T such that a cooling capacity of the cooling system 170 is increased if the temperature-indicating signal T reflects a milk temperature above a set temperature. Analogously, the control unit 110 is preferably also configured to generate the first control signal C1 based on the temperature-indicating signal T such that the cooling capacity of the cooling system 170 is decreased if the temperature-indicating signal T reflects a milk temperature below the set temperature. Thereby, it can be ensured that the output milk flow $M_{OUT}$ has a suitable temperature, for example around 3.5 degrees Celsius while the energy resources are economized.

According to one embodiment of the invention, the cooling system 170 contains a heat exchanger 160 configured to transfer heat energy from the flow of milk F to a coolant C, which is circulated in a chiller 167 by means of a coolant pump 165 operating in response to a second control signal C2. In this embodiment, the control unit 110 is further configured to generate the second control signal C2 based on the first level-indicating signal s(L). Specifically, the control unit 110 is configured to generate the second control signal C2 so that a flow of the coolant C and/or the cooling capacity of the chiller 167 increases if the prediction parameter $M_{IN}$est indicates that the estimated future input $M_{IN}$ of milk from the milking points MP1, MP2, . . . , MPn will increase during a predefined future interval, say 30 to 90 seconds and any one of the at least two predefined threshold levels $L_{min}$, $L_{mid}$, $L_{max}$ will cause the milk pump 150 to pump the flow of milk F out from the balance tank 120 at a higher flow rate $F_1$, $F_2$, $F_3$. Analogously, the control unit 110 is configured to generate the second control signal C2 so that the flow of the coolant C and/or the cooling capacity of the chiller 167 decreases if the prediction parameter $M_{IN}$est indicates that the estimated future input $M_{IN}$ of milk from the number points MP1, MP2, . . . , MPn will decrease during the predefined future interval and any one of the at least two predefined threshold levels $L_{min}$, $L_{mid}$, $L_{max}$ will cause the milk pump 150 to pump the flow of milk F out from the balance tank 120 at a lower flow rate $F_1$, $F_2$, $F_3$.

The cooling capacity of the heat exchanger 160 may be controlled up and down by adjusting the temperature of the coolant C, adjusting the speed of the coolant pump 165, or both.

The heat exchanger 160 may contain a plate heat exchanger (PHE), and the coolant C preferably contains water and glycol.

FIG. 2 shows a diagram representing a relationship between a milk-flow rate F and predefined threshold levels in the balance tank 120 according to one embodiment of the invention. Here, the horizontal axis indicates three threshold levels $L_{min}$, $L_{mid}$ and $L_{max}$ in relation to the milk level L measured in the balance tank 120, and the vertical axis F designates corresponding milk-flow rates $F_1$, $F_2$ and $F_3$ respectively at which the control unit 110 nominally will control the milk pump 150 to operate via the first control signal C1 depending on the milk level L measured in the balance tank 120. For example, a first threshold level $L_{min}$ may represent a level below 10% of the storage capacity of the balance tank 120, a second threshold level $L_{mid}$ may represent a level between 10% and 90% of the storage capacity of the balance tank 120 and a third threshold level $L_{max}$ may represent a level above 90% of the storage capacity of the balance tank 120.

According to one embodiment of the invention, the control unit 110 is configured to generate the first control signal C1 based on the first level-indicating signal s(L) such that an indicated milk level L in the balance tank 120 above a particular one of at least two predefined threshold levels $L_{min}$, $L_{mid}$ or $L_{max}$ respectively causes the milk pump 150 to pump the flow of milk F out from the balance tank 120 at a respective rate $F_1$, $F_2$ or $F_3$ corresponding to each one of the at least two predefined threshold levels $L_{min}$, $L_{mid}$ and $L_{max}$. As is apparent from the diagram in FIG. 2, $L_{mid}$ is above $L_{min}$ and $L_{max}$ is above $L_{mid}$. As is also apparent from the diagram in FIG. 2, $F_2$ represents a higher flow rate than $F_1$ and $F_3$ represents a higher flow rate than $F_2$.

Preferably, the control unit 110 is configured to generate the first control signal C1 based on the prediction parameter $M_{IN}$est such that the prediction parameter $M_{IN}$est overrides the first level-indicating signal s(L) to cause the milk pump 150 to pump the flow of milk F out from the balance tank 120 at a lower rate, say at $F_1$ or $F_2$, than the rate corresponding to the particular one of the at least two predefined threshold levels, say $L_{mid}$ or $L_{max}$ respectively, if the first level-indicating signal s(L) indicates that the milk level L in the balance tank 120 is above the particular one of at least two predefined threshold levels $L_{mid}$ or $L_{max}$; and the prediction parameter $M_{IN}$est indicates that the estimated future input $M_{IN}$ of milk from the milking points MP1, MP2, . . . , MPn is decreasing. This means that a temporarily elevated milk level L, i.e. above $L_{mid}$ or $L_{max}$, is accepted in the balance tank 120, say during a period of 30 to 90 seconds, since the control unit 110 "knows" that the milk level L will decrease soon anyway due to the decreasing input of milk $M_{IN}$. Thus, the milk flow rate is stabilized by avoiding an unnecessary and temporary increase in the pumping operation of the milk pump 150.

Analogously, the control unit 110 is configured to generate the first control signal C1 based on the prediction parameter $M_{IN}$est such that the prediction parameter $M_{IN}$est overrides the first level-indicating signal s(L) to cause the milk pump 150 to pump the flow of milk F out from the balance tank 120 at a higher rate, say at $F_2$ or $F_3$, than the rate corresponding to the particular one of the at least two predefined threshold levels, say $L_{min}$ or $L_{mid}$, if the first level-indicating signal s(L) indicates that the milk level L in the balance tank 120 is below the particular one of at least two predefined threshold levels $L_{min}$ or $L_{mid}$; and the prediction parameter $M_{IN}$est indicates that the estimated future input $M_{IN}$ of milk from the milking points MP1, MP2, . . . , MPn is increasing. This means that the milk pump 150 is kept operated at the higher rate, say during a period of 30 to 90 seconds, since the control unit 110 "knows" that the milk level L will increase soon due to the increasing input of milk $M_{IN}$. Thus, the milk flow rate is stabilized by avoiding an unnecessary and temporary decrease in the pumping operation of the milk pump 150.

Preferably, a backpressure sensor (not shown) is also included in the storage tank 130 or the conduit system between the storage tank 130 and the heat exchanger 160, which backpressure sensor is configured to compensate a milk pump speed to variations in the hydrostatic pressure resulting from the varying milk level in the storage tank 130. In other words, higher milk level in the storage tank 130 causes higher back pressure, which is compensated by running the milk pump 150 at relatively higher pump speed and vice versa.

The above pump speed compensation to the back pressure of the milk level in the storage tank 130 aims at maintaining a determined flow rate F of milk through the cooling system 170. Hence, if the storage tank 130 is almost empty the determined flow rate F of milk can be achieved by running the milk pump 150 at a relatively slow speed, while an almost full storage tank 130 requires the milk pump to run at relatively higher speed to push the milk into the storage tank at the determined flow rate.

FIG. 3 shows a block diagram of the control unit 110 according to the invention. It is generally advantageous if the controller 110 is configured to effect the above-described procedure in an automatic manner by executing a computer program 317. Therefore, the controller 110 may include a memory unit 316, i.e. non-volatile data carrier, storing the computer program 317, which, in turn, contains software for making processing circuitry in the form of at least one processor 315 in the controller 110 execute the actions mentioned in this disclosure when the computer program 317 is run on the at least one processor 315.

In order to sum up, and with reference to the flow diagram in FIG. 4, we will now describe the computer-implemented method according to one embodiment of the invention for controlling the flow of milk F through the cooling system 170 from the balance tank 120 to the storage tank 130, where the balance tank 120 receives an input $M_{IN}$ in the form of milk extracted from the milking points MP1, MP2, . . . , MPn.

In a first step 410, a first level-indicating signal s(L) is received, which first level-indicating signal s(L) reflects a milk level L in the balance tank 120.

In a second step 420, for example executed in parallel with step 410, a prediction parameter $M_{IN}$est is received, which prediction parameter $M_{IN}$est indicates an estimated future input $M_{IN}$ of milk from the number of milking points MP1, MP2, . . . , MPn.

In a step 430, after steps 410 and 420, a first control signal C1 is generated, which first control signal C1 is sent to a milk pump 150 in the cooling system 170. The milk pump 150 is arranged to cause the flow of milk F to be pumped out from the balance tank 120 at a flow rate determined by the first control signal C1.

Thereafter, the procedure loops back to steps 410 and 420.

The process steps described with reference to FIG. 4 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal, which may be conveyed, directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Variations to the disclosed embodiments can be understood and effected by those skilled in the art in practicing the claimed invention, from a study of the drawings, the disclosure, and the appended claims.

The term "comprises/comprising" when used in this specification is taken to specify the presence of stated features, integers, steps or components. The term does not preclude the presence or addition of one or more additional elements, features, integers, steps or components or groups thereof. The indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

It is also to be noted that features from the various embodiments described herein may freely be combined, unless it is explicitly stated that such a combination would be unsuitable.

The invention is not restricted to the described embodiments in the figures, but may be varied freely within the scope of the claims.

The invention claimed is:

1. A control unit (110) arranged to control a flow of milk (F) through a cooling system (170) from a balance tank (120) to a storage tank (130), the balance tank (120) receiving an input (MIN) of milk from a number of milking points, the control unit (110) configured to:

receive a first level-indicating signal (s(L)) reflecting a milk level in the balance tank (120);

receive a prediction parameter ($M_{IN}$est) indicating an estimated future input (MIN) of milk from the number of milking points; and generate, based on both the first level-indicating signal (s(L)) and the prediction parameter ($M_{IN}$est), a first control signal (C1) to a milk pump (150) in the cooling system (170), said milk pump (150) arranged to cause the flow of milk (F) to be pumped out from the balance tank (120) at a flow rate determined by the first control signal (C1), wherein the control unit compares an indicated milk level (L) in the balance tank, determined from the first level-indicating signal (s(L)), to at least two predefined threshold levels, and generates the first control signal (C1) such that an indicated milk level (L) in the balance tank (120) above any one of the at least two predefined threshold levels causes the milk pump (150) to pump the flow of milk (F) out from the balance tank (120) at one of at least two flow rates, the at least two flow rates respectively corresponding to the at least two predefined threshold levels, wherein the control unit determines that the indicated milk level (L) exceeds a first threshold level of the at least two predefined threshold levels causing the milk pump (150) to pump the flow of milk (F) at a first flow rate of the at least two flow rates, and wherein the control unit determines that the indicated milk level (L) exceeds a second threshold level of the at least two predefined threshold levels causing the milk pump (150) to increase the flow of milk (F) from the first flow rate to a second flow rate of the at least two flow rates.

2. The control unit (110) according to claim 1, wherein the prediction parameter ($M_{IN}$est) is based on a second level-indicating signal (s($L_{RT}$)) reflecting a milk level in a receiver tank (RT) in which milk from at least one of the number of milking points is collected before being fed into the balance tank (120).

3. The control unit (110) according to claim 1, wherein the prediction parameter ($M_{IN}$est) is based on at least one of:

an opening and/or closing of an entrance gate (G1) in to a closed area where the number of milking points are located, an opening and/or closing of an exit gate (G2) out from the closed area where the number of milking points are located, information about a number of milking animals currently being attached to the number of milking points, information about a number of milking animals currently being detached from the number of milking points, information about a milk flow or milk yield from milking animals currently delivering milk via the number of milking points, and information about a previous milk yield or milk flow curve of the milking animals currently delivering milk via the number of milking points.

4. The control unit (110) according to claim 1, wherein the prediction parameter ($M_{IN}$est) is based on at least one of:

identity information relating to milking animals that are present in a closed area where the number of milking points are located, and temporal data indicating an extension of a period during which the milking animals have been present in the closed area where the number of milking points are located.

5. The control unit (110) according to claim 1, wherein the control unit processes the prediction parameter ($M_{IN}$est) so that, when generating the first control signal (C1), the prediction parameter ($M_{IN}$est) overrides the first level-indicating signal (s(L)) so that an operation at the controller to cause the milk pump to increase to a higher one of the at least two flow rates due to an increased milk level (L) in the balance tank past a higher one of the at least two predefined threshold levels is overridden and the milk pump (150) continues to pump the flow of milk (F) out from the balance tank (120) at a lower one of the at least two flow rates corresponding to a lower one of the at least two predefined threshold levels if:

the indicated milk level (L) in the balance tank (120) is above the higher one of the at least two predefined threshold levels, and the prediction parameter ($M_{IN}$est) indicates that the estimated future input ($M_{IN}$) of milk from the number of milking points is decreasing.

6. The control unit (110) according to claim 1, wherein the control unit processes the prediction parameter ($M_{IN}$est) so that, when generating the first control signal (C1), the prediction parameter ($M_{IN}$est) overrides the first level-indicating signal (s(L)) so that an operation at the controller to cause the milk pump to decrease to a lower one of the at least two flow rates due to a decreased milk level (L) in the balance tank below a higher one of the at least two predefined threshold levels is overridden and the milk pump (150) continues to pump the flow of milk (F) out from the balance tank (120) at a higher one of the at least two flow rates corresponding to a higher one of the at least two predefined threshold levels, if:

the indicated milk level (L) in the balance tank (120) is below the higher one of the at least two predefined threshold levels, and the prediction parameter ($M_{IN}$est) indicates that the estimated future input ($M_{IN}$) of milk from the number of milking points is increasing.

7. The control unit (110) according to claim 1, further configured to:

receive a temperature-indicating signal (T) from a temperature sensor (140) measuring a temperature of the flow of milk (F) before entering the storage tank (130); and incorporate the temperature-indicating signal (T) in generating the first control signal (C1), such that a cooling capacity of the cooling system (170) is increased if the temperature-indicating signal (T) reflects a milk temperature above a set temperature.

8. The control unit (110) according to claim 7, wherein the first control signal (C1) is generated such that the cooling capacity of the cooling system (170) is decreased if the temperature-indicating signal (T) reflects a milk temperature below the set temperature.

9. The control unit (110) according to claim 1, wherein the cooling system (170) comprises a heat exchanger (160) configured to transfer heat energy from the flow of milk (F) to a coolant (C) being circulated in a chiller (167) by means of a coolant pump (165) operating in response to a second control signal (C2), and wherein the control unit (110) is further configured to generate the second control signal (C2) based on the first level-indicating signal (s(L)) so that:

a flow of the coolant (C) and/or the cooling capacity of the chiller (167) increases if the prediction parameter ($M_{IN}$est) indicates that the estimated future input ($M_{IN}$) of milk from the number of milking points will increase during a predefined future interval and the indicated milk level (L) exceeds any one of the at least two predefined threshold levels so as to cause the milk pump (150) to pump the flow of milk (F) out from the balance tank (120) at a higher flow rate, and the flow of the coolant (C) and/or the cooling capacity of the chiller (167) decreases if the prediction parameter ($M_{IN}$est) indicates that the estimated future input ($M_{IN}$) of milk from the number of milking points will decrease during the predefined future interval and the indicated milk level (L) falls below any one of the at least two predefined threshold levels so as to cause the milk pump (150) to pump the flow of milk (F) out from the balance tank (120) at a lower flow rate.

10. A computer-implemented method for controlling a flow of milk (F) through a cooling system (170) from a balance tank (120) to a storage tank (130), the balance tank (120) receiving an input (MIN) of milk from a number of milking points, the method comprising:

receiving a first level-indicating signal (s(L)) reflecting a milk level in the balance tank (120);

receiving a prediction parameter ($M_{IN}$est) indicating an estimated future input ($M_{IN}$) of milk from the number of milking points;

generating, based on both the first level-indicating signal (s(L)) and the prediction parameter ($M_{IN}$est), a first control signal (C1) to a milk pump (150) in the cooling system (170), said milk pump (150) arranged to cause the flow of milk (F) to be pumped out from the balance tank (120) at a flow rate determined by the first control signal (C1); and comparing an indicated milk level (L) in the balance tank, determined from the first level-indicating signal (s(L)), to each of at least two predefined threshold levels, wherein, in response to determining the indicated milk level (L) exceeds one or more of the at least two predefined threshold levels, the milk pump (150) is controlled to pump the flow of milk (F) out from the balance tank (120) at a respective one of at least two flow rates, such that in response to determining the indicated milk level (L) exceeds a first threshold level of the at least two predefined threshold levels, the milk pump (150) is controlled to pump the flow of milk (F) at a first flow rate of the at least two flow rates, and in response to determining the indicated milk level (L) exceeds a second threshold level of the at least two predefined threshold levels, the milk pump (150) is controlled to increase the flow of milk (F) from the first flow rate to a second flow rate of the at least two flow rates.

11. The method according to claim 10, wherein the prediction parameter ($M_{IN}$est) is based on a second level-indicating signal (s($L_{RT}$)) reflecting a milk level in a receiver tank (RT) in which the milk from at least one of the number of milking points is collected before being fed into the balance tank (120).

12. The method according to claim 10, wherein the prediction parameter ($M_{IN}$est) is based on at least one of:

an opening and/or closing of an entrance gate (G1) in to a closed area where the number of milking points are located, and an opening and/or closing of an exit gate (G2) out from the closed area where the number of milking points are located, information about a number of milking animals currently being attached to the number of milking points, information about a number of milking animals currently being detached from the number of milking points, information about a milk flow or milk yield from the milking animals currently delivering milk via the number of milking points, and information about a previous milk yield or milk flow curve of the milking animals currently delivering milk via the number of milking points.

13. The method according to claim 10, wherein the prediction parameter ($M_{IN}$est) is based on at least one of:

identity information relating to milking animals that are present in a closed area where the number of milking points are located, and temporal data indicating an extension of a period during which the milking animals have been present in the closed area where the number of milking points are located.

14. The method according to claim 10, wherein the control unit processes the prediction parameter ($M_{IN}$est) so that, when generating the first control signal (C1), the prediction parameter ($M_{IN}$est) overrides the first level-indicating signal (s(L)) so that an operation to cause the milk pump to increase to a higher one of the at least two flow rates due to an increased milk level (L) in the balance tank past a higher one of the at least two predefined threshold levels is overridden and the milk pump (150) continues to pump the flow of milk (F) out from the balance tank (120) at a lower one of the at least two flow rates corresponding to a lower one of the at least two predefined threshold levels, if:

the indicated milk level (L) in the balance tank (120) is above the higher one of the at least two predefined threshold levels and the prediction parameter ($M_{IN}$est) indicates that the estimated future input ($M_{IN}$) of milk from the number of milking points is decreasing.

15. The method according to claim 10, wherein the control unit processes the prediction parameter ($M_{IN}$est) so that, when generating the first control signal (C1), the prediction parameter ($M_{IN}$est) overrides the first level-indicating signal (s(L)) so that an operation at the controller to cause the milk pump to decrease to a lower one of the at least two flow rates due to a decreased milk level (L) in the balance tank below a higher one of the at least two predefined threshold levels is overridden and the milk pump (150) continues to pump the flow of milk (F) out from the balance tank (120) at a higher one of the at least two flow rates corresponding to a higher one of the at least two predefined threshold levels, if:

the indicated milk level (L) in the balance tank (120) is below the higher one of the at least two predefined threshold levels, and the prediction parameter ($M_{IN}$est) indicates that the estimated future input ($M_{IN}$) of milk from the number of milking points is increasing.

16. The method according to claim 10, further comprising:

receiving a temperature-indicating signal (T) from a temperature sensor (140) measuring a temperature of the flow of milk (F) before entering the storage tank (130); and incorporating the temperature-indicating signal (T) in generating the first control signal (C1), such that a cooling capacity of the cooling system (170) is increased if the temperature-indicating signal (T) reflects a milk temperature above a set temperature.

17. The method according to claim 16, wherein, in generating the first control signal (C1), the cooling capacity of the cooling system (170) is decreased if the temperature-indicating signal (T) reflects a milk temperature below the set temperature.

18. The method according to claim 10, wherein the cooling system (170) comprises a heat exchanger (160) configured to transfer heat energy from the flow of milk (F) to a coolant (C) being circulated in a chiller (167) by means of a coolant pump (165) operating in response to a second control signal (C2), and the method further comprises generating the second control signal (C2) based on the first level-indicating signal (s(L)) so that:

a flow of the coolant (C) and/or the cooling capacity of the chiller (167) increases if the prediction parameter ($M_{IN}$est) indicates that the estimated future input ($M_{IN}$) of milk from the number of milking points will increase during a predefined future interval and the indicated milk level (L) exceeds any of the at least two predefined threshold levels so as to cause the milk pump (150) to pump the flow of milk (F) out from the balance tank (120) at a higher flow rate, and the flow of the coolant (C) and/or the cooling capacity of the chiller (167) decreases if the prediction parameter ($M_{IN}$est) indicates that the estimated future input ($M_{IN}$) of milk from the number of milking points will decrease during the predefined future interval and the indicated milk level (L) falls below any one of the at least two predefined threshold levels will cause the milk pump (150) to pump the flow of milk (F) out from the balance tank (120) at a lower flow rate.

19. A non-volatile, non-transitory data carrier (316) readable by a processing unit (315) and having recorded thereon a computer program (317) comprising software configured to execute the method according to claim 11 when the computer program (317) is run on the processing unit (315).

* * * * *